United States Patent [19]

Nieminski et al.

[11] Patent Number: 4,513,839
[45] Date of Patent: Apr. 30, 1985

[54] DISC BRAKE ARRANGEMENT FOR STEERING AND TRACTION UNIT

[75] Inventors: Robert A. Nieminski; Walter R. Hinde, both of Philadelphia, Pa.

[73] Assignee: Yale Materials Handling Corporation, Flemington, N.J.

[21] Appl. No.: 492,113

[22] Filed: May 6, 1983

[51] Int. Cl.³ ............................................. B60K 17/30
[52] U.S. Cl. ................................. 180/253; 180/65.5; 188/72.8
[58] Field of Search ............... 180/65.5, 65.6, 214, 180/252, 253; 188/72.8

[56] References Cited

U.S. PATENT DOCUMENTS

| | | | |
|---|---|---|---|
| 1,185,630 | 6/1916 | Carr | 180/214 |
| 2,327,583 | 8/1943 | Framhein | 180/65.6 |
| 2,564,002 | 8/1951 | Gibson | 180/253 |
| 2,612,968 | 10/1952 | Hood | 188/72.8 |
| 2,779,425 | 1/1957 | Miller | 180/65.6 |
| 2,950,773 | 8/1960 | Ulinski | 180/21 |
| 3,024,873 | 3/1962 | Wilkinson | 188/72.8 |
| 3,057,426 | 10/1962 | Hastings | 180/65.5 |
| 3,280,933 | 10/1966 | Jones | 180/253 |
| 3,698,504 | 10/1972 | Harvey | 180/253 |
| 3,848,692 | 11/1974 | Messner et al. | 180/253 |
| 3,892,300 | 7/1975 | Hapeman et al. | 180/65.6 |
| 4,461,367 | 7/1984 | Eichinger et al. | 180/252 |

Primary Examiner—David M. Mitchell
Assistant Examiner—Mark C. Dukes
Attorney, Agent, or Firm—C. H. Grace; C. J. Toddy

[57] ABSTRACT

A brake system for wheeled vehicles, especially lift trucks having one motorized drive wheel driven by a vertically mounted electric motor through a gear train. The axis of the motor is offset from the steering axis of the wheel and a disc brake is mounted at the end of the motor shaft remote from the gear train. The reaction of the disc brake is grounded to the truck frame.

6 Claims, 5 Drawing Figures

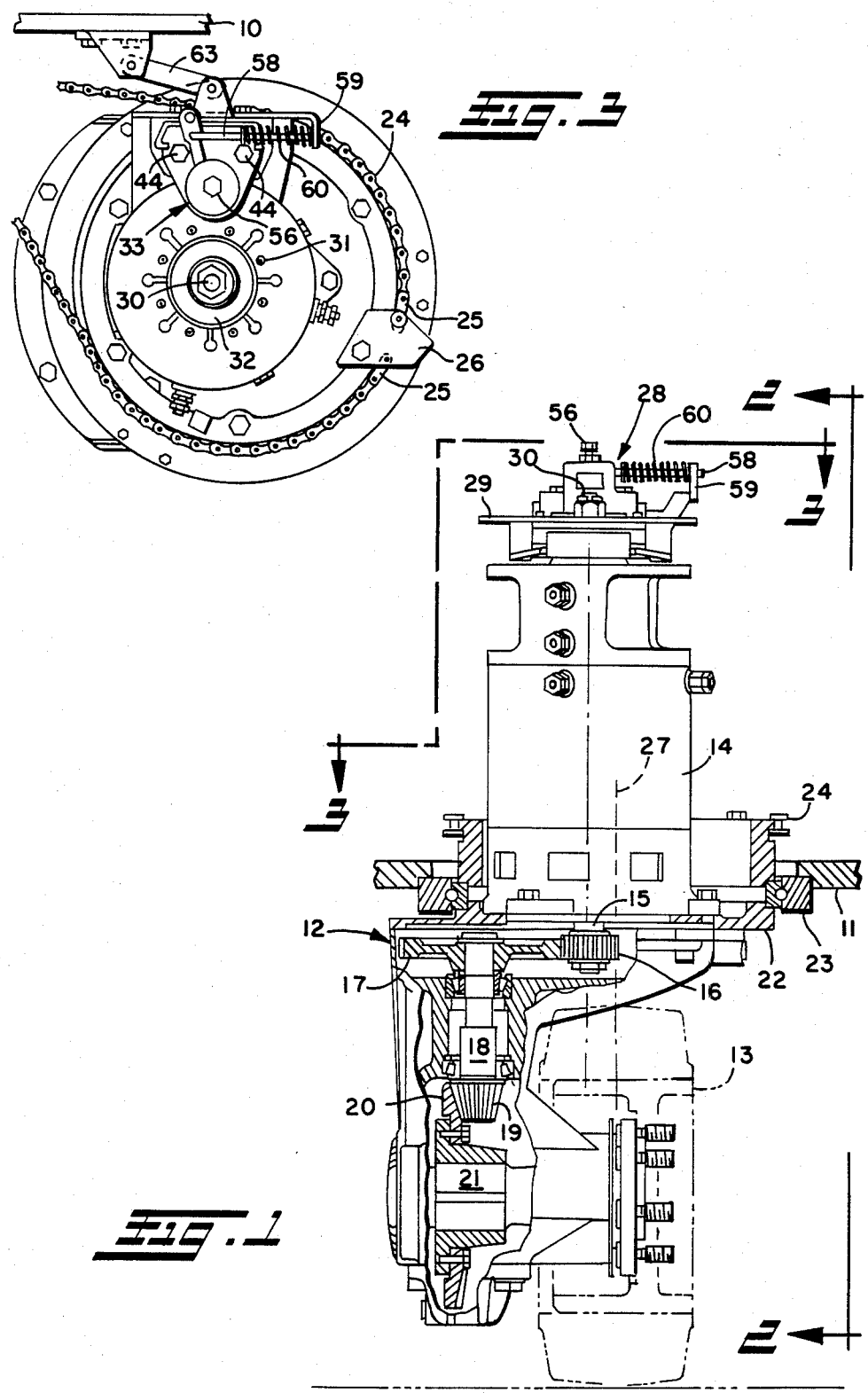

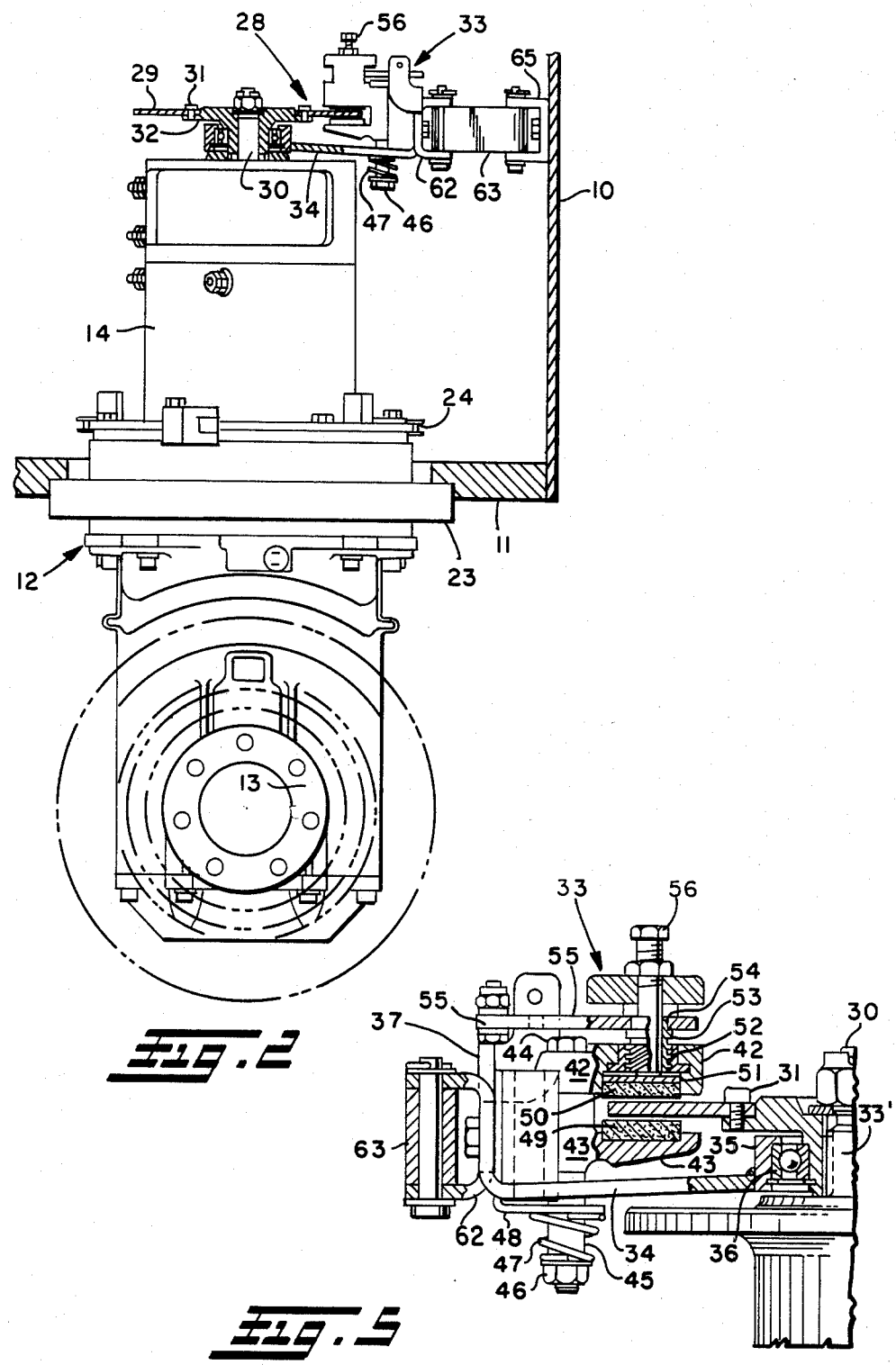

DISC BRAKE ARRANGEMENT FOR STEERING AND TRACTION UNIT

This invention relates to a parking brake for a steering and traction unit that is adapted for rotation relative to the main frame of an industrial truck in order to impart directional movement to the truck. It is customary in such units to utilize a motor and a traction wheel, together with gears through which the motor drives the wheel. The entire unit, comprising the parts set forth, is adapted for steering rotation about a vertical axis relative to the frame of the truck.

It is desirable to make the brakes on such steering and traction units as small as possible in order to minimize the size of the drive assemblies themselves. As well as being compact, it is necessary that the brake on such a unit be readily accessible for purposes of maintenance and repair, and further that the brake not interfere with access to the drive motor or other portions of the drive assembly.

Also, a vertically mounted drive motor, the axis of which is eccentrically located relative to the steering axis of the industrial truck requires extreme flexibility with the brake actuators when the brakes are included at the drive motor.

It is an object of this invention to provide a steering and traction unit for an industrial truck with a disc brake assembly mounted on the armature shaft of the motor which is readily accessible for purposes of maintenance and repair and further does not interfere with access to the drive motor or other portions of the drive assembly.

It is a further object of the invention to provide a disc brake assembly for a steering and traction unit in which the brake reaction forces generated upon operation of the brake are transmitted directly to the truck frame inspite of the fact that the axis of the drive motor is substantially offset from the steering axis of the truck.

Referring now to the drawings,

FIG. 1 is a vertical elevational view with parts broken away and in cross-section showing the steering and traction unit;

FIG. 2 is a vertical side elevational view with parts broken away and in cross-section showing the steering and traction unit;

FIG. 3 is a plan view of the steering and traction unit shown in FIG. 2;

FIG. 5 is a vertical elevational view of the caliper brake and brake disc with parts broken away and in cross-section.

Figure 4:
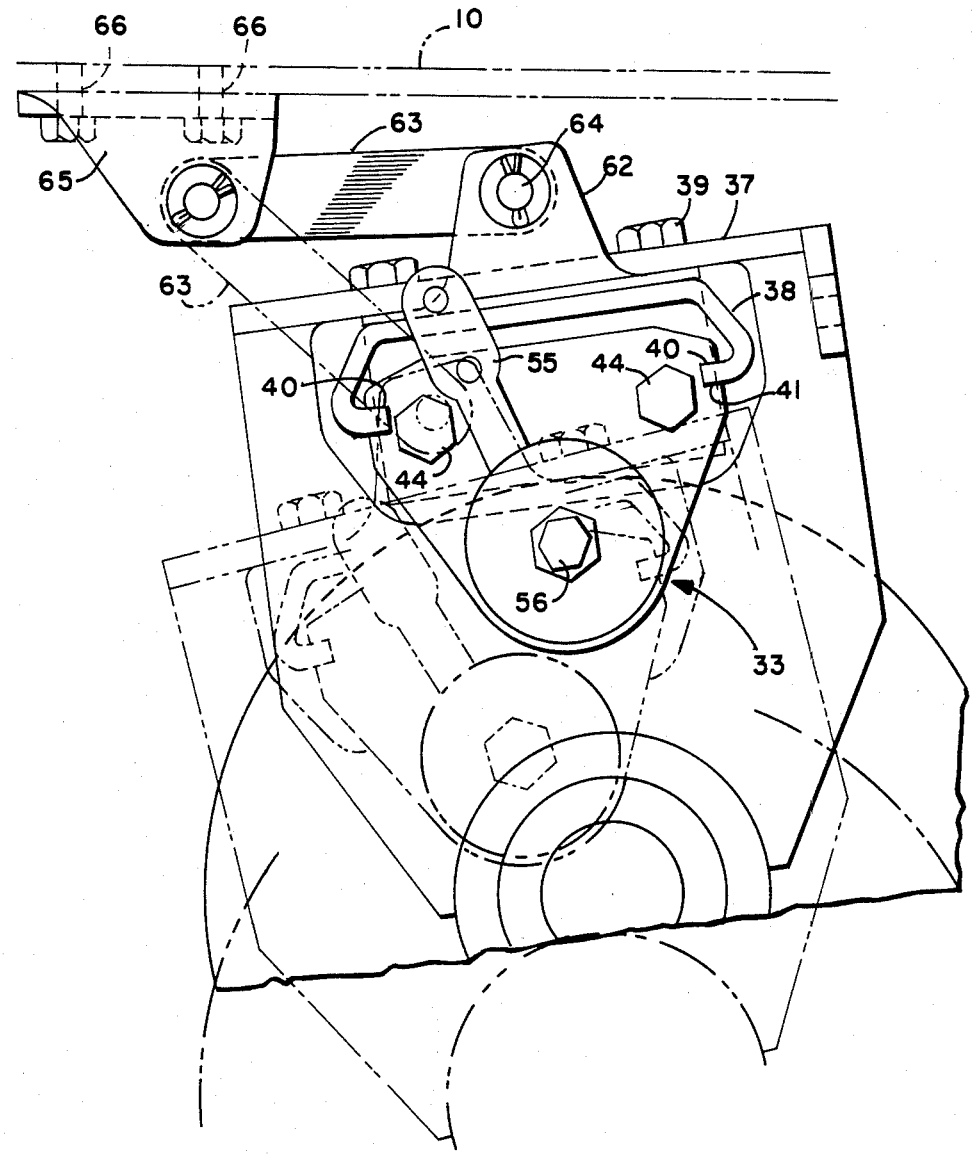
FIG. 4 is a view similar to FIG. 3 showing the position of the caliper brake in the extreme right hand and left hand steering positions.

FIG. 1 shows a lift truck having a main frame 10 on which are mounted the wheels of the truck. The main frame includes a horizontal frame member 11 on which is mounted the steering and traction unit generally referred to by the numeral 12. The unit 12 includes a ground engaging drive wheel which is also a steerable wheel. The unit 12 also includes a drive motor 14 vertically mounted on the frame member 11 so that the armature shaft 15 extends vertically. The lower end of the shaft 15 has a pinion gear 16 secured thereto meshing with a gear 17 mounted on the upper end of pinion shaft 18. A lower end of pinion shaft 18 is provided with a gear 19 meshing with a gear 20 secured to the wheel axle 21 on which the wheel 13 is mounted.

The steering and traction unit 12 is mounted for rotation relative to the frame 10. The motor 14 is mounted on a bearing plate 22 having a circular bearing assembly 23 secured to the frame member 11 so that the tire steering and traction unit 12 including the motor 14, the gear train and the drive wheel 13 are rotatable on the bearing assembly 23.

As shown in FIG. 3, a steering chain 24 extends around the upper end of the bearing plate 22 and the ends 25 of the chain are secured to a bracket 26 also mounted on the bearing plate 22. The chain 24 extends around a sprocket which is secured to the steering wheel shaft mounted in the operator compartment (not shown) of the truck. When the steering sprocket is turned in one direction the steering and traction unit 12 rotates about the axis of the bearing assembly 23. The centerline of the bearing 23 is the steering axis 27 of the truck and is offset from the axis of the motor armature shaft 15, as clearly shown in FIG. 1.

A caliper disc brake unit 28 is mounted on the upper end 30 of the motor shaft 15, as shown in FIG. 5. The brake disc 29 is secured by bolts 31 to a hub 32 which is rotatably mounted on the upper end 30 of the shaft 15 so that the brake disc revolves with shaft 15. The caliper assembly 33 is mounted on a bracket 34 having a circular collar 35 mounted on a bearing 36 interposed between the hub 32 and the collar 35. Thus, the caliper bracket 34 is freely rotatable around the disc hub 32.

The caliper bracket 34 extends beyond the periphery of the brake disc 29 and includes a vertically extending ear 37. A "C" shaped mounting member 38 is connected to the ear 37 by a pair of bolts 39. The mounting member 38 is provided with vertically extending parallel ends 40 forming tracks which extend into slots 41 formed in the sides of an upper and lower caliper 42 and 43. The calipers 42 and 43 are secured together by bolts 44 extending through matching holes in each caliper. A spacing tube 45 extends around each bolt and abuts the bottom surface of the lower caliper 43 and the nut 46. A spring 47 is positioned between the nut and a plate 48 clamped between the member 40 and the ear 37. The spring 47 biases the calipers relative to the plate 48 for limited vertical movement of the calipers along the tracks formed in the "C" shaped member 40.

A fixed friction pad 49 is carried by the lower caliper 43 while a movable friction pad 50 is slideably inserted in a bore 51 formed in the upper caliper 42. The brake disc 29 is interposed between the pads 49 and 50.

The upper caliper 42 is provided with a female threaded nut member 52 engaging a male threaded screw member 53. The members 52 and 53 are provided with coarse multiple threads so that upon slight rotation of the screw member 53, the nut member 52 is displaced axially a relatively large distance.

The outer end of the screw member 53 is formed with an integral square shaft 54. A square hole in the brake actuating lever 55 snugly fits about the square shaft 54. The adjusting bolt 56 is threaded with the center part of the screw member 53 and the tip end of the bolt 56 contacts the pad 50 so that the pad may be adjusted relative to the disc.

As seen in FIG. 4, the outer end of the lever 55 is connected to a control wire or the like (not shown) for rotating the operating lever 55 in a clockwise direction as viewed in FIG. 4. As seen in FIGS. 1 and 3, a rod 58 is connected to the operating lever 55 and a lug 59 with a spring 60 interposed between the lug 59 and a flange 61 affixed to the rod so that when the operating lever 55 is moved clockwise as viewed in FIG. 3, the spring 60 is compressed or biased. Upon release of the control wire or the like, by the operator, the spring returns the lever 55 to its normal position as shown in FIG. 3.

The caliper bracket 34 is further provided with a bracket 62 which is welded to the ear 37 and a link 63 is pivotally connected to the bracket 62 by a pin 64. The link 63 is also pivoted at the opposite end to a bracket 65 fastened to the frame member 10 of the vehicle by means of bolts 66. The link 63 functions to ground the caliper assembly 33 caused by the reaction forces when the brake is actuated while permitting rotation of the caliper assembly as the steering position of the wheel 13 is varied about the axis 27 shown in FIG. 1.

We claim:

1. A material handling vehicle comprising in combination, a vehicle frame supported by a plurality of wheels, at least one of said wheels comprising a drive-steer wheel carried on an assembly rotatably journaled in said frame about a vertical steering axis, said drive assembly comprising a base member, an electric motor mounted vertically on said base member, the axis of said motor shaft being offset from the steering axis, a speed reduction gear train interposed between said motor shaft and said wheel for driving the wheel, means for rotating said drive assembly about the steering axis to steer said vehicle, a brake disc fixedly mounted on said motor shaft for rotation in a horizontal plane, a bracket rotatably mounted on said motor shaft adjacent said disc, a caliper brake secured to said bracket and operably cooperating with said disc to brake said drive-steer wheel, means to actuate the caliper brake, and means for connecting said brake bracket to the vehicle frame for grounding the reaction of said brake to the frame and permitting limited rotational movement of said bracket and caliper brake at various steering positions of the wheel.

2. A material handling vehicle as claimed in claim 1 in which the brake disc and bracket are mounted to the upper end of the motor shaft.

3. A material handling vehicle as claimed in claim 2 in which the bracket is mounted for rotation in a plane between the brake disc and said motor.

4. A material handling vehicle as claimed in claim 1 in which the connecting means is a rigid link pivotally connected to said bracket and to the truck frame.

5. A material handling vehicle as claimed in claim in which said bracket is provided with a projection extending radially outwardly from the motor shaft and one end of said rigid link is connected to said projection.

6. A material handling vehicle as claimed in claim 5 in which said link moves angularly through an acute angle around the pivot at said frame as the steering position of the wheel moves from an extreme right hand to an extreme left hand position.

* * * * *